United States Patent [19]

Schutten et al.

[11] Patent Number: 5,764,494

[45] Date of Patent: Jun. 9, 1998

[54] SATURABLE REACTOR AND CONVERTER FOR USE THEREOF

[75] Inventors: Michael Joseph Schutten; William George Earls, both of Schenectady, N.Y.

[73] Assignee: Lockheed Martin Corporation, Moorestown, N.J.

[21] Appl. No.: 800,721

[22] Filed: Mar. 13, 1997

[51] Int. Cl.⁶ .................................................. H02M 3/335
[52] U.S. Cl. .................................................. 363/17; 363/132
[58] Field of Search .......................... 363/15, 17, 20, 363/22, 56, 95, 98, 132; 336/83, 84 R, 155, 218

[56] References Cited

U.S. PATENT DOCUMENTS

| | | | |
|---|---|---|---|
| 3,818,313 | 6/1974 | Rosenstein et al. | 363/132 |
| 4,031,452 | 6/1977 | Longa et al. | 363/37 |
| 4,827,150 | 5/1989 | Reynal | 307/66 |
| 4,864,479 | 9/1989 | Steigerwald et al. | 363/17 |
| 4,928,020 | 5/1990 | Birx et al. | 307/106 |
| 5,132,889 | 7/1992 | Hitchcock et al. | 363/17 |
| 5,315,496 | 5/1994 | Okochi et al. | 363/21 |
| 5,325,283 | 6/1994 | Farrington et al. | 363/21 |
| 5,418,703 | 5/1995 | Hitchcock et al. | 363/17 |
| 5,426,409 | 6/1995 | Johnson | 336/178 |
| 5,442,540 | 8/1995 | Hua et al. | 363/98 |
| 5,497,310 | 3/1996 | Noda et al. | 363/17 |
| 5,539,630 | 7/1996 | Pietkiewicz et al. | 363/17 |
| 5,684,678 | 11/1997 | Barrett | 363/17 |

OTHER PUBLICATIONS

"A 500 KHZ Multi-Output Converter With Zero Voltage Switching", by D.B. Dalal, publ. by IEEE at pp. 265-274 of proceedings of the Applied Power Electronics Conference, 1990.

"An Improved Full-Bridge Zero-Voltage-Switched PWM Converter Using A Saturable Inductor", by Hua et al, publ. in the IEEE Transactions on Power Electronics, vol. 8, No. 4, Oct. 1993. pp. 530-534.

*Primary Examiner*—Adolf Berhane
*Attorney, Agent, or Firm*—W. H. Meise; S. D. Weinstein; S. A. Young

[57] ABSTRACT

A switching converter achieves improved regulation range by the use of a saturable reactor in series with a transformer primary. The saturable reactor uses a conventional magnetic pot core including a magnetic shell and center post. The location at which the post joins the shell is perforated to reduce the cross-section of magnetic material, so that, at low reactor currents, incremental inductance is established by the gap between post and lid, and at high reactor currents, the incremented inductance is established by saturation at the base of the post. Perforation at the base of the post also results in generation of heat at a location immediately adjacent the flat bottom of the pot core.

11 Claims, 8 Drawing Sheets

SATURABLE REACTOR AND CONVERTER FOR USE THEREOF

FIELD OF THE INVENTION

This invention relates to dc-to-dc converters, and more specifically to saturable reactors for use therein.

BACKGROUND OF THE INVENTION

A full-wave low-loss switching dc-to-dc power converter is described in U.S. Pat. No. 4,864,479, issued Sep. 5, 1989, in the name of Steigerwald et al. This converter uses a full-wave bridge switching bridge circuit which switches to produce a varying voltage across a pair of load terminals. The load terminals of the bridge are coupled to a rectifier arrangement by a transformer having leakage inductance and magnetizing inductance selected to coact with parasitic reactances and inherent diodes of the switching elements, in such a manner as to minimize switching losses. The operation of this circuit is thoroughly explained in an article entitled "*A 500 KHZ MULTI-OUTPUT CONVERTER WITH ZERO VOLTAGE SWITCHING*" by Dhaval Dalal, published by IEEE at pp 265-274 of proceedings of the Applied Power Electronics Conference, 1990.

A paper entitled "*AN IMPROVED FULL-BRIDGE ZERO-VOLTAGE-SWITCHED PWM CONVERTER USING A SATURABLE INDUCTOR*", by Hua et al., published in the IEEE Transactions on Power Electronics, Vol. 8, No. 4, October, 1993, shows that the use of a saturable reactor (or saturable inductor) in such a dc-to-dc switching converter can improve the regulation under certain conditions. When a saturable reactor is used in power converter applications, the alternating magnetic flux in the paramagnetic or ferromagnetic core of the saturable reactor causes the magnetic domains to repeatedly reverse magnetization, which results in unwanted heat generation. In addition to representing an unavoidable power loss, the heat must be removed from the magnetic core to prevent thermal damage. It is difficult to design efficient saturable magnetic cores in a manner which makes removal of heat possible in a simple manner.

Improved dc-to-dc converters, and improved saturable reactors therefor, are desired.

SUMMARY OF THE INVENTION

A saturable reactor arrangement according to the invention includes a ferromagnetic pot core arrangement having, when assembled, the general exterior form of a right circular cylinder. The right circular cylinder defines first and second flat, mutually parallel, approximately circular ends, an axis, and a fastener clearance aperture passing through the right circular cylinder parallel to, and centered on, the axis. The first and second ends of the right circular cylindrical form of the pot core arrangement are at least approximately centered on, and perpendicular to, the axis. The pot core arrangement is divided into two ferromagnetic portions along a division plane perpendicular to the axis and lying between the first and second ends. At least one of the portions of the pot core arrangement includes a ferromagnetic shell portion which, together with the other one of the portions of the pot core arrangement (which may simply be a flat lid), defines the right circular cylindrical exterior form. The ferromagnetic shell portion of at least one of the portions of the pot core arrangement has a shell thickness selected to define a cavity within the shell, with the cavity being in the general shape of a right circular cylinder defining a bottom or fundus adjacent one of the first and second ends. The cavity of the one of the portions of the pot core arrangement contains an axial post defining proximal and distal ends. The proximal end of the post of the one of the portions of the pot core arrangement is monolithically affixed to the bottom of the cavity, with the post extending distally from the bottom, parallel with the axis, toward the division plane. The post contains the fastener clearance aperture. The post of the one of the portions of the pot core arrangement further includes (a) a distal portion of the post in the form of an annular ring of ferromagnetic material lying in a plane parallel to the division plane, (b) a plurality of apertures extending through the side of a second portion of the post and through a portion of the bottom, which second portion of the post lies between the distal portion of the post and the bottom, with the plurality of apertures being located so as to divide the second portion of the post into a plurality of legs, each of which legs extends from the bottom of the cavity to the distal portion of the post, for supporting the distal portion of the post at a predetermined location relative to the division plane. The post of the one of the portions of the pot core arrangement also has (c) each of the legs of the plurality of legs monolithically affixed to the bottom along a support surface having a first dimension approximately equal to the thickness of the bottom of the cavity, and a second dimension approximately equal to the width of that one of the legs being supported thereby, and (d) the surfaces of the support areas of the plurality of legs have a cumulative or total area which is less than that of the post and less than that of the shell, so that magnetic fields generated within the cavity of the pot core, and flowing through the post and the shell, must pass through the cumulative area of the support areas, and so that magnetic saturation of the pot core occurs preferentially at the surfaces of the support areas, whereby the heat generated by magnetic saturation of the core preferentially occurs adjacent one of the first and second ends of the pot core arrangement.

In a particular embodiment of the invention, the other one of the portions of the pot core arrangement is a flat cover, but the other portion of the pot core arrangement may be similar to the one of the portions defining a cavity. In a preferred embodiment, a thermally conductive, non-ferromagnetic material fills the plurality of apertures extending through the side of the second portion of the post and the bottom, to aid in transferring heat away from the support surfaces. The thermally conductive material may be thermally conductive epoxy. The preferred embodiments include a thermally conductive heat sink affixed to that one of the first and second ends of the pot core arrangement adjacent the thermally conductive, non-ferromagnetic material, for aiding in transferring heat away from the support surfaces. In one embodiment, the legs support the distal portion of the post at a predetermined location relative to the division plane, which location is selected to leave a gap between the distal portion of the post the other one of the portions of the pot core arrangement, so that the magnetic reluctance of the saturable reactor using the pot core arrangement is established, in the linear operating regime, by the gap, and, in a saturated operating regime, by the support areas.

The saturable reactor arrangement preferably includes a conductive coil wound about the post of the one of the portions of the pot core assembly, and also includes a transformer including a primary winding and a secondary winding, with the primary winding being serially connected with the coil to define a series circuit. This embodiment also includes a switched bridge circuit, preferably a full bridge, coupled to the series circuit, and adapted for applying alternating voltage thereto, as a result of which electrical drive, such as voltage, current, or a combination thereof, is generated at the secondary winding of the transformer. A unidirectional conducting device arrangement is coupled to the secondary winding of the transformer, for rectifying the electrical drive, and a substantially linear reactor is coupled to the unidirectional conducting device arrangement and to a load, for supplying electrical drive current to the load. The load includes a load resistance, and may include an integrating capacitor for integrating voltage to establish a voltage across the resistance. A controller may be coupled to the switched bridge circuit, for causing the switches of the bridge circuit to switch in a manner tending to maintain constant electrical drive to the load.

A dc-to-dc converter according to an aspect of the invention includes a switched bridge circuit with load terminals, which switches in a manner which produces electrical drive across load terminals. A series circuit including a saturable reactor (or inductive reactance) and the primary winding of a transformer is coupled across the load terminals of the bridge circuit. The transformer also includes a secondary winding arrangement, which generates electrical drive when the bridge operates. The electrical drive is coupled to a rectifier arrangement, for rectifying the electrical drive. The rectified drive is applied through a substantially linear inductor or reactor to a load circuit, which may include a resistive component and a capacitive component. The saturable reactor includes a ferromagnetic pot core arrangement having, when assembled, the general exterior form of a right circular cylinder. The right circular cylinder defines first and second flat, mutually parallel, approximately circular ends, an axis, and a fastener clearance aperture passing through the right circular cylinder parallel to, and centered on, the axis. The first and second ends of the right circular cylindrical form are at least approximately centered on, and perpendicular to, the axis. The pot core arrangement is divided into two ferromagnetic portions along a division plane perpendicular to the axis and lying between the first and second ends. At least one of the portions of the pot core arrangement includes a ferromagnetic shell portion which, together with the other one of the portions of the pot core arrangement, defines the right circular cylindrical exterior form. The ferromagnetic shell portion of at least one of the portions of the pot core arrangement has a shell thickness selected to define a cavity within the shell, with the cavity being in the general shape of a right circular cylinder defining a bottom adjacent one of the first and second ends. The cavity of the one of the portions of the pot core arrangement contains an axial post defining proximal and distal ends. The proximal end of the post of the one of the portions of the pot core arrangement is monolithically affixed to the bottom of the cavity, with the post extending distally from the bottom, parallel with the axis, toward the division plane. The post contains the fastener clearance aperture. The post of the one of the portions of the pot core arrangement further includes (a) a distal portion of the post in the form of an annular ring of ferromagnetic material lying in a plane parallel to the division plane, (b) a plurality of apertures extending through the side of a second portion of the post and the bottom, which second portion of the post lies between the distal portion of the post and the bottom, with the plurality of apertures being located so as to divide the second portion of the post into a plurality of legs, each of which legs extends from the bottom of the cavity to the distal portion of the post, for supporting the distal portion of the post at a predetermined location relative to the division plane. The post of the one of the portions of the pot core arrangement also has (c) each of the legs of the plurality of legs monolithically affixed to the bottom along a support surface having a first dimension equal to the thickness of the bottom of the cavity, and a second dimension equal to the width of that one of the legs being supported, and (d) the surfaces of the support areas of the plurality of legs have a cumulative or total area which is less than that of the post and less than that of the shell, so that magnetic fields generated within the cavity of the pot core, and flowing through the post and the shell, must pass through the cumulative area of the support areas

BRIEF DESCRIPTION OF THE DRAWINGS

FIG. 5b and 5c is an assembled view of the arrangement of FIG. 5a;

DESCRIPTION OF THE INVENTION

Figure 1:
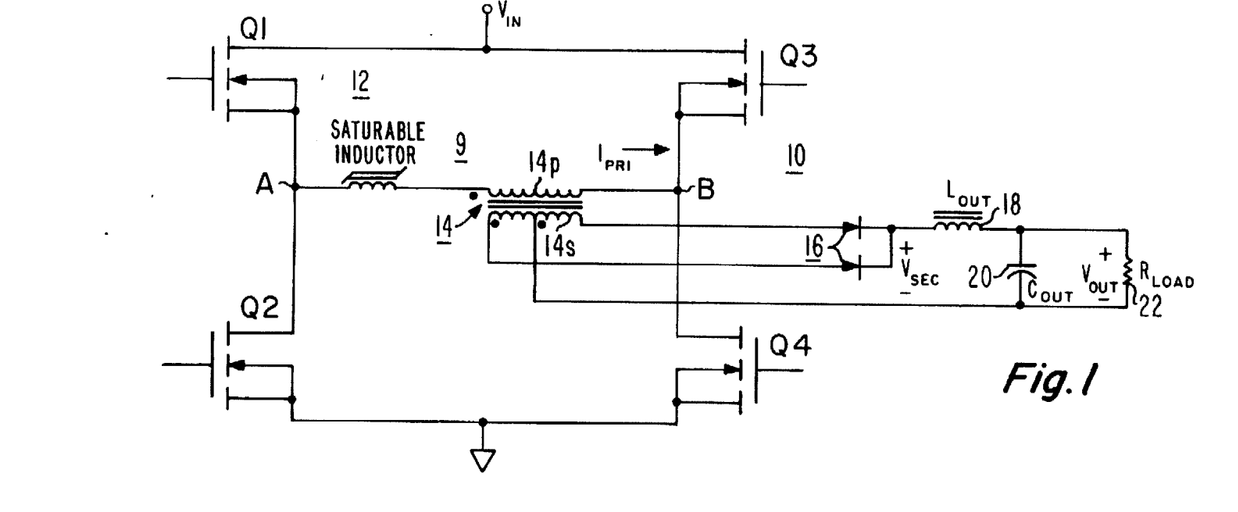
FIG. 1 is a simplified schematic diagram of a prior-art dc-to-dc converter using a saturable reactor and a bridge of controlled switches to drive the primary winding of a transformer.

In FIG. 1, a dc-to-dc converter 10 includes a full-wave switching bridge circuit 12, which contains four switches or metal-oxide-semiconductor field-effect transistors (MOSFETs), illustrated as FETs Q1, Q2, Q3, and Q4. The bridge circuit 12 is coupled to a source of voltage illustrated by the source Vin and the reference ground symbol. The gates of FETs Q1, Q2, Q3, and Q4 are driven by gate drive signals illustrated by the amplitude-time plots Q1, Q2, Q3, and Q4 of FIGS. 2a, 2b, 2c, and 2d, respectively. The switching of the FETs by the gate signals causes a voltage designated as $V_{AB}$ in FIG. 2e to be generated across (between) bridge load terminals or nodes A and B. It should be noted that when an element is coupled "between" two terminals in an electrical system, there is no suggestion of physical location of the various elements, but instead the "between" language indicates only that electrical connections are made to the terminals, by whatever circuitous route, and with the elements themselves in whatever location. Thus, the voltage illustrated as $V_{AB}$ appears at terminal A relative to that at terminal B.

A series circuit 9, which includes the serial connection of an inductor 8 and the primary winding 14p of a transformer 14, is connected to (between) terminals A and B of the bridge 12. Thus, voltage $V_{AB}$ is applied to the serial connection of the inductor 8 and primary winding 14p. Transformer 14 also includes a secondary winding arrangement 14s. The primary and secondary windings of transformer 14 are marked with standard dot notation to illustrate polarity. Secondary winding arrangement 14s includes a center-tap connected to one end (the lower end) of a load circuit including a resistive load ($R_{load}$) 22 and a current-integrating capacitor 20. The switching of the bridge circuit 12 causes alternating electrical drive to be applied to the primary winding 14p, which in turn results in generation of electrical drive (voltage or current) at secondary winding 14s. The two ends of secondary winding arrangement 14s are each illustrated as being connected to unidirectional current conducting devices (rectifiers, diodes, SCRs, or the like) of a rectifier arrangement illustrated as 16. As illustrated, rectifier arrangement 16 is illustrated as containing two rectifiers or diodes. Rectifier arrangement 16 rectifies the electrical drive from the secondary winding arrangement 14s, to produce rectified electrical drive at the left end of a linear output inductor ($L_{out}$) 18. In this context, a "linear" inductor (as opposed to a "saturable"inductor) is one in which the incremental inductance does not change a great deal with variations in the electrical current. However, those skilled in the art know that any inductor with a ferromagnetic core is susceptible to variation of incremental inductance at very high currents, so the concept of "linear" and "saturable" operation of inductors necessarily implies, or assumes, a particular maximum current level at which the inductor operates.

Figure 3:
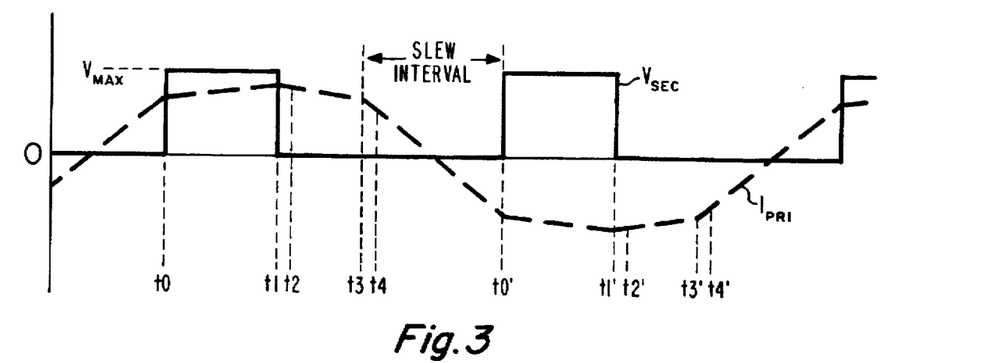
FIG. 3 is a plot of the primary current and secondary voltage of the transformer of FIG. 1 when a linear inductor is used in series with the transformer primary.

As a matter of background, the operation of the converter 10 of FIG. 1, with its inductor 8 linear as well as its inductor 18, is explained first, in conjunction with the waveforms of FIG. 3a.

In operation of the arrangement of FIG. 1 with the drive waveforms of FIGS. 2a, 2b, 2c, and 2d, with both inductors operating in a linear mode, the state of the converter 10 at time t0 is such that switches Q1 and Q4 are conducting, and the current in the serial combination 9 (inductor 8 and primary winding 14p), and in output inductor 18 is increasing, with the primary current of the transformer 14 in series with the "reflected" output current. The reflected current is that current which is applied to the primary winding to generate the secondary winding current, and the values of the current differ in proportion to the relative impedances at the primary and secondary windings. The increasing current stores an increasing amount of energy in the magnetic fields associated with inductors 8 and 18. Since Q1 and Q4 are conductive in the interval t0–t1, the voltage at node A is at the maximum positive value, and the voltage at node B is essentially zero or at its maximum negative value; the voltage $V_{AB}$ between nodes A and B, and across the primary winding 14p, results in a maximum secondary voltage $V_{max}$ in the interval t0–t1, as illustrated in FIG. 3.

Figure 2A:
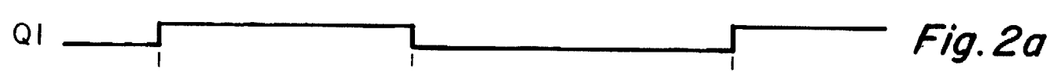
FIGS. 2a, 2b, 2c, and 2d are amplitude-time plots of gate drive of the switches Q1, Q2, Q3, and Q4, respectively, of FIG. 1.

At time t1, switch Q1 of FIG. 1 is gated OFF, as indicated by the negative-going step in the gate voltage illustrated in FIG. 2a. Switch Q4 remains in conduction in the interval t1–t2. The energy stored in the magnetic fields of inductor 8 at time t1 tends to drive the voltage at node A negative (down or low), in tending to maintain the current flow in inductor 8. The current flow as the voltage at node A falls (becomes lower) flows through the body capacitances of switches Q1 and Q2 immediately after time t1. When the voltage at node A drops to near zero volts, the intrinsic diode of FET Q2 becomes conductive, and, inductor 8 becomes a source of energy, which causes current to flow in a loop including Q4 in its gated-ON state, and also including the inherent diode of Q2. Since Q4 is conductive in the interval t1–t2, the voltage at node B is near zero volts, and since the inherent diode of Q2 is conductive, the voltage at node A is also near zero volts; the voltage $V_{AB}$ between A and B is therefore zero in the interval t1–t2. Also in the interval t1–t2, the current in inductor 18 does not increase, because there is no secondary winding 14s voltage to drive the inductor 18 current higher, but the energy stored in inductor 18 tends to continue, supplying energy to the load consisting of resistance 22 and capacitor 20. The presence of capacitor 20 tends to integrate the current from inductor 18 to tend to maintain the voltage across load resistor 22. Thus, toward the end of the interval t1–t2, current flows in the forward direction in gated-ON switch Q4 and in the reverse direction in gated-OFF switch Q2.

Figure 2B:
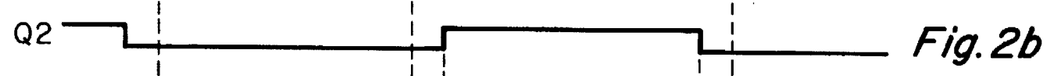
Figure 2C:
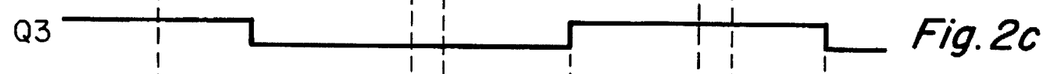

At time t2, switch Q2 is rendered potentially forward-conductive by virtue of its gate voltage rise, illustrated in FIG. 2b. This makes no immediate difference, because the current flow in the interval t2–t3 is in the reverse direction for Q2, and is carried by the inherent diode of Q2. In the interval t2–t3, the secondary voltage of transformer 14 is zero, and the current in output inductor 18 is decreasing at the rate $di/dt=-V_{OUT}/L_{OUT}$, as some of its energy is given up to the load. The primary current through transformer 14 is also decreasing, as inductor 8 gives up some of its energy to losses in the current loop. Thus, at time t3, the secondary voltage of transformer 14 is zero.

Figure 2D:
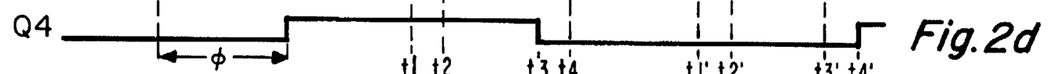
Figure 2E:
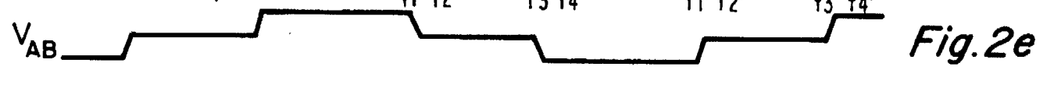
FIG. 2e is an amplitude-time plot of the voltage at the load terminals of the bridge of FIG. 1 as a result of operation of the switches in the presence of an applied supply voltage.

At time t3, FET Q4 is turned OFF by a transition of its gate voltage, illustrated in FIG. 2d. After time t3, the energy stored in inductor 8 tends to maintain the current in the primary winding 14p of transformer 14. With Q4 nonconductive, the voltage at node B is driven positive, charging the capacitance of Q4, and discharging the capacitance of Q3, until the voltage at node B reaches about the supply voltage $V_{IN}$, at which time, namely at time t4, the inherent diode of FET Q3 becomes conductive, to clamp the voltage rise to $V_{IN}$.

Just before time t4, therefore, Q1 and Q4 of FIG. 1 are gated OFF, Q2 is gated ON, and both Q2 and Q3 are conducting in the reverse direction by virtue of their inherent diodes, with the current decreasing. The voltage between nodes A and B is $-V_{IN}$, which is in a direction which tends to reverse the current through the series combination of inductor 8 and primary winding 14p. At time t4, FET Q3 is gated ON, but the current flow is still in the reverse direction in Q3, through its inherent diode.

In the interval t4–t0', primary current $I_{PRI}$ in the primary winding 14p of FIG. 1 decreases toward zero and begins to rise again. At a time between time t4 and time t0', the current in the primary winding reaches zero, as illustrated by dash-line plot $I_{PRI}$ of FIG. 3. At this time, the current flow commutates from the inherent diodes of Q2 and Q3 to forward-direction conduction. The current continues to fall, or to rise in the reverse direction under the impetus of the voltage $V_{AB}$, until the time t0', at which time the primary current $I_{PRI}$ becomes equal to the reflected output inductor 18 current. It should be noted that time t0' is inherent in the operation of the system, and no external control signal is required to cause the switching at time t0', and as a result no transition is illustrated in FIGS. 2a, 2b, 2c, 2d, or 2e. The remainder of the operation of the arrangement of FIG. 1 with a linear inductor or reactor 8 can be determined by symmetry and with the aid of FIG. 3.

Figure 4:
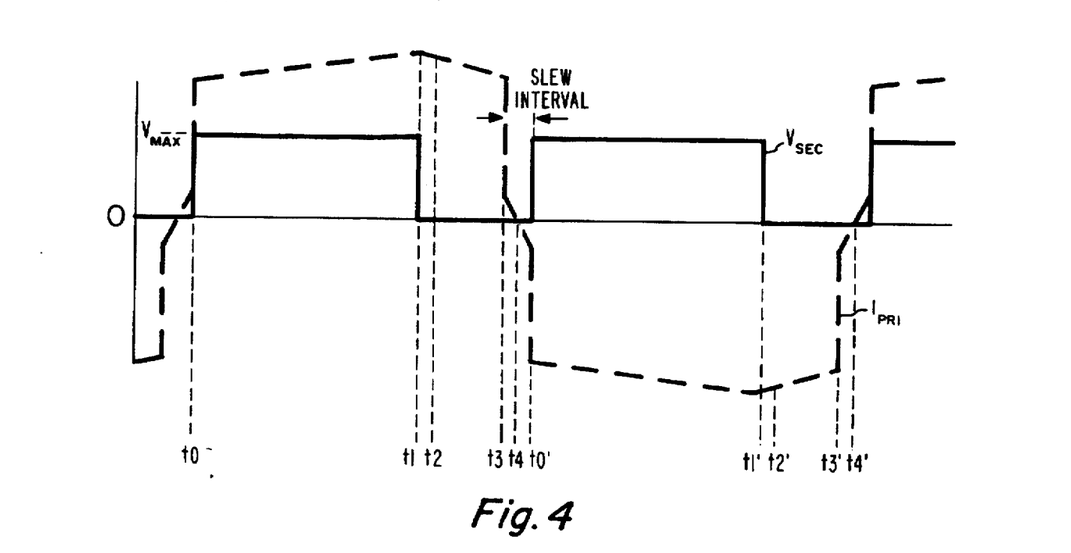
FIG. 4 is a corresponding plot when a saturable reactor is used.

Control of the output voltage is achieved in the arrangement of FIG. 1, as so far described in conjunction with FIG. 3, is established by control of the times at which the switches of bridge 12 are controlled. The output voltage of the power converter is regulated against input line voltage and output load current variations by the switching action. The switching frequency of the converter is generally maintained constant, which is to say that the interval t0'–t0 of FIGS. 3 and 4 is maintained constant. The voltage $V_{SEC}$ of FIGS. 2, 3, and 4 varies between zero volts and a fixed voltage $V_{MAX}$. The voltage $V_{MAX}$ is constant for a fixed input voltage and fixed output load. The steady-state output voltage of the converter is the average of the voltage of secondary voltage $V_{SEC}$.

$$V_{out} = V_{max}\left(\frac{t_1 - t_0}{t_0' - t_0}\right)$$

The switching action of the converter modulates the width of the $V_{SEC}$ pulse, which is to say that it varies the duration t1–t0 (and also t0'). The average value of $V_{SEC}$ is the desired regulated output voltage.

When a saturable reactor is used in place of linear reactor 8, the operation is much the same as that described above in the intervals t0–t4, but the operation in the interval t4–t0' is changed, as illustrated in conjunction with FIG. 4. More particularly, the interval t3–t0' can be made shorter than in the case of a linear inductor 8. This shorter interval, in turn, allows the interval t0–t1 (and t0'–t1) to be longer, which in turn allows the secondary voltage $V_{SEC}$ to equal $V_{MAX}$ for a longer period of time, and thus to have a larger volt-second product applied to output inductor 18 of FIG. 1. It is important to understand that the voltage $V_{MAX}$ is proportional to the input voltage, which means that $V_{MAX}$ is smaller for a smaller values of input voltage. Since, under steady-state conditions, the time-averaged voltage t0–t0 across inductor 18 is zero, the output voltage $V_{OUT}$ across the load can be regulated to a larger voltage using a saturable inductor, as opposed to a linear inductor. In other words, the longer the time that $V_{SEC}$ is positive, the greater the output voltage. Similarly, a converter using a saturable inductor 8, in the presence of a fixed load current, can regulate the output voltage with a lower input voltage than if it were to use a linear inductor 8. A converter using a saturable reactor, therefore, can regulate over a wider input voltage range under most conditions.

Figure 5A:
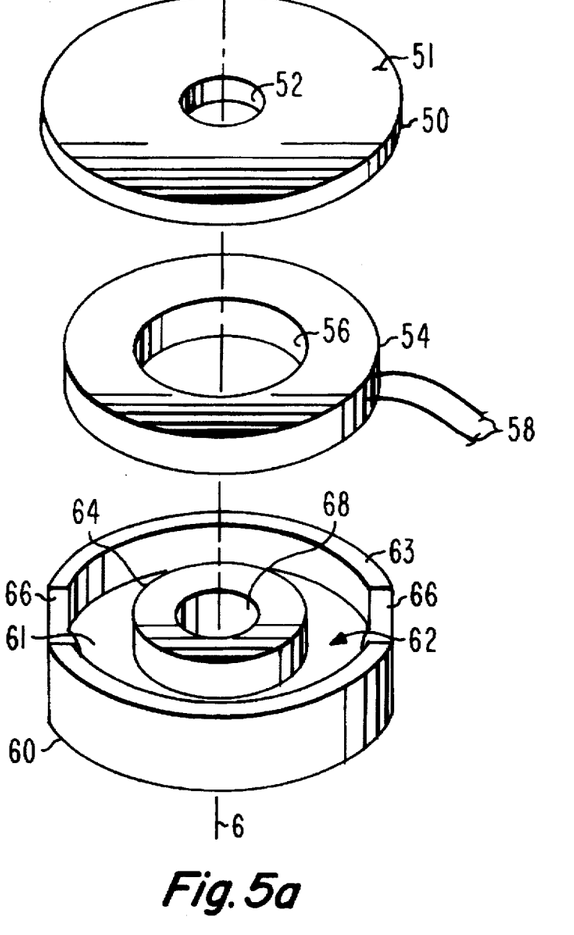
FIG. 5a is a simplified exploded illustration of an ordinary ferromagnetic pot core with a ferromagnetic lid, a ferromagnetic shell defining a cavity containing a center post, and a coil bobbin adapted for fitting in the cavity and around the post.
Figure 5B:
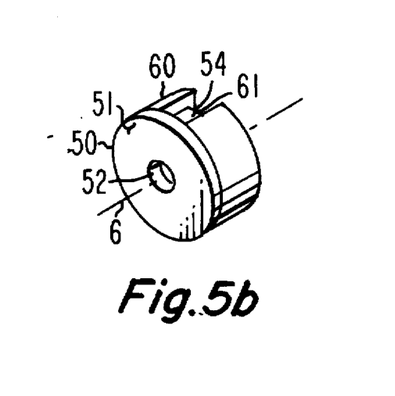
Figure 5C:
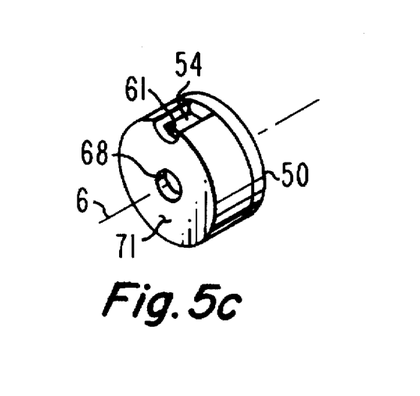

FIGS. 5a and 5b illustrate a conventional pot core arrangement 1, including a flat, circular ferromagnetic lid portion 50, centered about an axis 6, and a main portion in the form of a ferromagnetic shell 60 with a bottom 61, which together define a cavity 62, an annular edge 63, and a post 64 monolithically integral with shell 60. Shell 60 has its sides cut away, as illustrated at two locations 66. Lid portion 50 and shell portion 60 each contain a through or clearance aperture through which a fastener can pass for holding the two portions together, and to a support, as required. The fastener aperture in the lid is designated 52, and the fastener aperture in the shell passes through the center post 64, and is designated 68. The pot core arrangement of lid 50 and shell 60 are made into a reactor by addition of a coil wound within a bobbin 54, dimensioned to fit within cavity 62, with the bobbin central aperture 56 dimensioned to fit over post 64. The terminals of the coil bobbin 54 are illustrated as being wires 58, which, when the bobbin is inserted into cavity 62, protrude through one or both of shell cutaways 66. FIG. 5b illustrates the structure of FIG. 5a assembled, to form a right circular cylindrical shape defining a first flat end 51 nominally centered on axis 6, and with another similar flat surface 71 of shell portion 60, as illustrated in FIG. 5c. Those skilled in the art know that the ferromagnetic pot core arrangement with a coil, as illustrated in FIGS. 5a, 5b, and 5c, can be operated in a linear mode by maintaining the coil current below some particular level, and it can also be operated in a saturated mode, by increasing the current in the same coil. However, when so operated, the heat occasioned by repeated reversal of the saturation polarization of the ferromagnetic material is distributed throughout the entire pot core assembly. While the pot core assembly can be mounted to a heat sink by one (or even both) of its flat surfaces 51 and 71, removal of heat depends ultimately on the rate of conduction of heat through the ferromagnetic material itself.

Figure 6A:
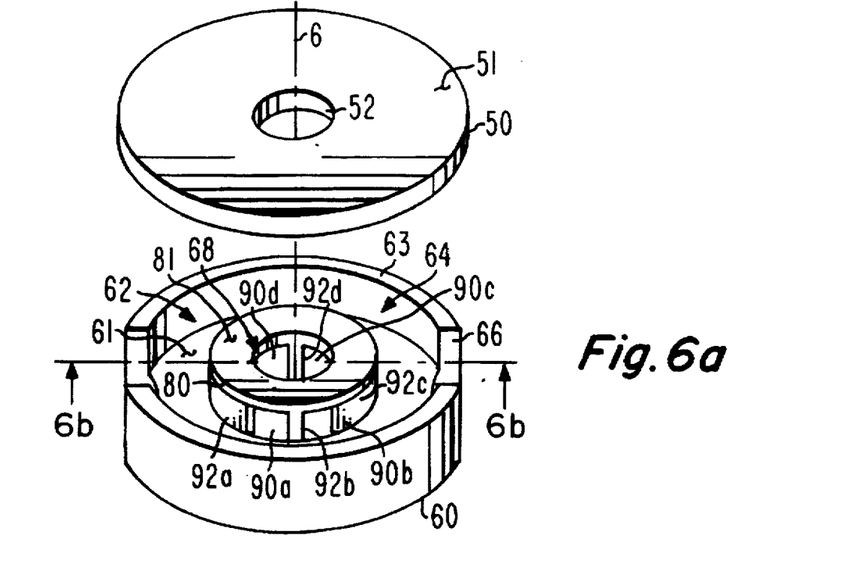
FIG. 6a is an exploded perspective or isometric illustration of a pot core arrangement, seen from the cavity side, in which the pot core is modified in accordance with an aspect of the invention by making apertures in the center post, to thereby form a plurality of legs.

According to an aspect of the invention, the saturable portion of the ferromagnetic pot core arrangement is placed adjacent to one of the flat mounting surfaces 51, 71, with the remainder of the core being operated in a linear mode. This, in turn, causes the heat attributable to saturation of part of the core to be generated "immediately" adjacent to the flat mounting surface, so that heat can be extracted from the saturable part of the core without having the heat pass through a long thermal path to reach the heat sink. This is accomplished as described in conjunction with FIGS. 6a, 6b, 6c, and 6d. More particularly, FIG. 6a illustrates an ordinary pot core assembly including a lid portion 50 and a shell portion 60 such as those of FIG. 5a, modified according to the invention. As illustrated in FIGS. 6a, 6b, 6c, and 6d, cavity-62-containing ferromagnetic portion 60 of the pot core assembly 1 contains a ferromagnetic post 64 which is modified by making several through fenestrations (windows) or apertures 90 through portions 65 of the post 64 and the shell bottom 61, to form a plurality of legs 92. Apertures are not made in a distal portion 80 of post 64, so that distal portion 80 of post 64 takes on the appearance of a circular washer with a fastener aperture 68. More particularly, four apertures 90a, 90b, 90c, and 90d are made in that portion 65 of the post 64 which lies between distal portion 80 of the post 64 and bottom 61 of the shell 60 cavity 64. In other words, the portion of the post 64 which is fenestrated by apertures 90a, 90b, 90c, and 90d is that portion of the post which is proximal to distal portion 80 of the post. The four apertures 90a, 90b, 90c, and 90d define four remaining portions 92a 92b , 92c, and 92d, which form "legs" which support the distal end 80 of the post 64. As is more visible in FIG. 6b, the upper surface 81 of distal portion 80 lies in a plane designated as 181, which is parallel to the plane of bottom plane 171 of shell portion 64, and which is also parallel to the parting plane 160p, which represents the plane of the outer edge 63 of the shell 60, and also represents the plane along which the assembled lid portion 50 and shell portion 60 of the pot core arrangement "parts" when disassembled. Apertures 90a, 90b, 90c, and 90d may be made by machining the ferromagnetic material of the shell with appropriate tools, or by etching, to remove the material from the apertures.

Figure 6B:
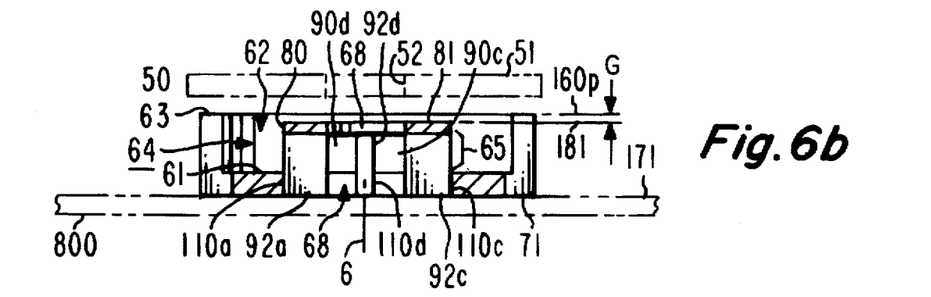
FIG. 6b is a cross-section of the pot core of FIG. 6a, FIG. 6c is a perspective or isometric illustration of the pot core of FIG. 6a as seen from the bottom side.

The four legs 92a, 92b, 92c, and 92d of FIGS. 6a, 6b, 6c, and 6d, each have a cross-sectional area parallel to planes 160p or 171 which is much less than the cross-sectional area of the shell 60 at any plane lying between planes 160p and 171. Consequently, the resistance to the flow of magnetic fields or reluctance of each of the legs is much greater than that of the shell, or lid, or of the post in its original, nonperforated state. The legs are in magnetic parallel in the ordinary operation of the pot core arrangement, but even their combined cross-sectional areas are substantially less than that of the other structures of the pot core arrangement. This alone would cause saturation to occur preferentially in the legs before saturation would occur in the shell 60 or lid 50, or in the distal portion 80 of the post 64. However, the heat generated in the most distal portions of the legs, were the legs to be operated in saturation, would still have to pass through the entire length of each leg to reach the bottom surface 71 of pot core arrangement, if the heat sink (illustrated in phantom in FIG. 6b as a sheet 800 affixed to the bottom surface 71) were to be mounted on that surface. It should be noted that in the configuration of the pot core arrangement as illustrated in FIG. 6b, that a heat sink plate affixed to the upper surface 51 of the lid portion 50 would not be nearly as effective as in the illustrated location of sheet 800, because the upper or distal end 81 of post 64 is spaced away from the parting plane 160p, and so cannot be in physical contact with the lid 50, and the post therefore cannot be in good thermal communication with the lid. Similarly, while the edge of the shell portion is nominally in contact with the lid along parting plane 160p, there is still a physical gap, however thin, which will impede the flow of heat from the shell to the lid. By contrast, the shell 60, including its cylindrical sides, its bottom 61, and post 64, are cast and fired as one monolithic piece, which maximizes the thermal conduction between one portion and the next. The making of apertures in the post should preferably be done in a way which avoids formation of cracks which might affect heat flow.

According to another aspect of the invention, the apertures 90a, 90b, 90c, and 90d are made to penetrate not only through the sides of the post to thereby define legs 90a, 90b, 90c, and 90d, but also to penetrate through a portion of the bottom portion 61 of the shell 60, to thereby reduce the cross-sectional area of the support of each of the legs. This has the advantage of reducing the cross-sectional area of the support region lying between the legs 90a, 90b, 90c, and 90d and the bottom portion 61 of the shell portion 60 of the pot core arrangement, so that the support region has a smaller cumulative cross-sectional area than even the legs, and magnetic saturation takes place preferentially in the support region. Since the support region is immediately adjacent the bottom 61 of the shell portion 60 of the pot core arrangement, the heat generated as a result of repeated reversals of magnetic saturation occurs immediately adjacent the bottom, and can travel through a very short path to the heat sink 800.

Figure 6C:
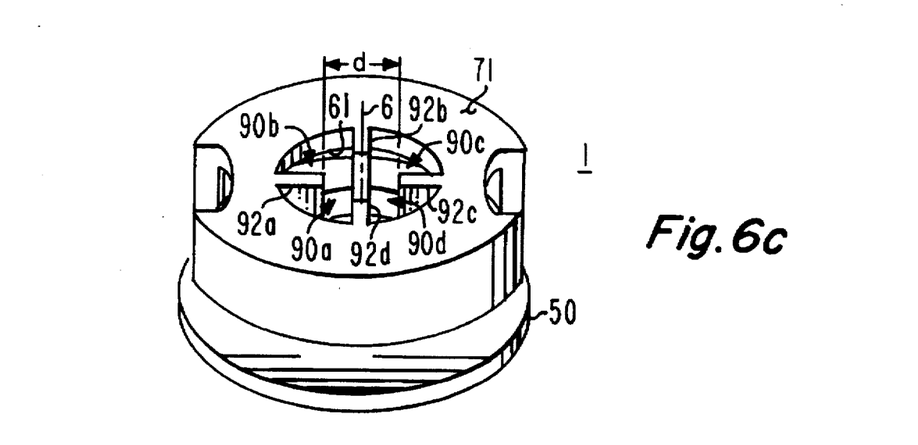

FIG. 6c illustrates the cutting away of the bottom in accordance with an aspect of the invention. In FIG. 6c, the diameter of the original fastener aperture 68 is illustrated as d, equal to, or the same as, the closest dimension between mutually opposed ones of legs 90. As illustrated in FIG. 6c, a circular portion of the bottom is also cut away by apertures 90a, 90b, 90c, and 90d; in other words, apertures 90a, 90b, 90c, and 90d extend through a portion of bottom 61 of shell portion 60 of the pot core arrangement. Thus, the machining operation or etching by which aperture 90a is made not only cuts through or "eats" the post 64, but also cuts through a portion of the bottom to form a roughly semicircular aperture portion bounded by two sides by the adjacent legs 92a and 92d. Similarly, aperture 90b cuts through a portion of post 64, and also cuts through a portion of the bottom bounded by two sides by the adjacent legs 92a and 92b, aperture 90c cuts through post 64 and part of the bottom bounded on two sides by the adjacent legs 92b and 92c. Such cuts are readily made by numerically controlled machines.

Figure 6D:
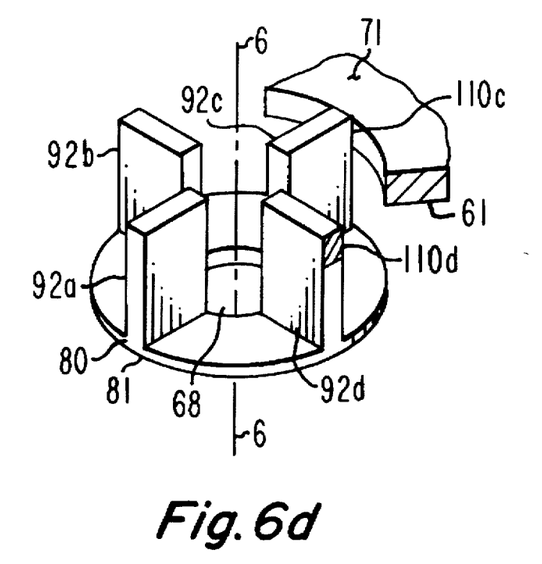
FIG. 6d is a perspective or isometric illustration of the legs of FIG. 6a and their support, isolated from the remainder of the structure.
Figure 6E:
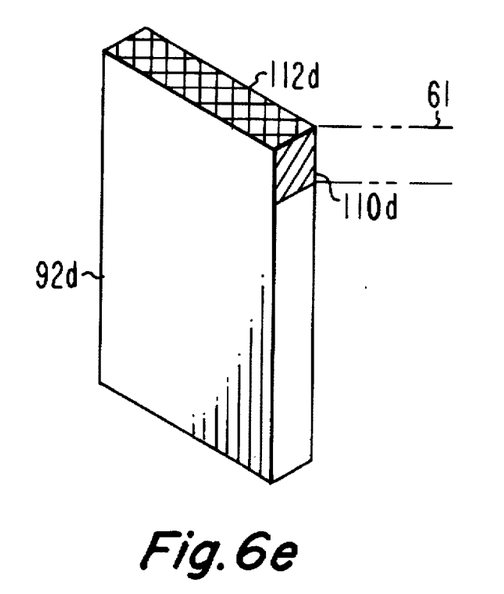
FIG. 6e is an illustration of a leg and its support region in isolation.

When the abovedescribed cuts 90a, 90b, 90c, and 90d are made in the post 64 and the bottom 61, the legs 92a, 92b, 92c, and 92d, which support distal portion 80 of the post, are themselves supported only by a relatively small support area, which has a width about equal to the width of the associated leg, and a thickness about equal to the thickness of the bottom 61 of the shell portion 60. FIG. 6d is an illustration of the legs 92a, 92b, 92c, and 92d, the distal end 80 of the post, and a portion of the bottom 61, separated from the remainder of the structure of FIG. 6a. In FIG. 6d, the location of the support region of leg 92c by bottom portion 61 is designated 110c, and the support for leg 92d is illustrated as the hatched region 110d. It will be apparent that the support region 110d has a width equal to the width of the leg 92d, and a thickness equal to the thickness of bottom portion 61. Thus, the support region, through which the magnetic field must flow in passing between the bottom 61 and the distal end 80 of the post 64, has about the same width as the leg, but has a length (measured parallel to the axis 6 of the structure) which is much less than the width of a leg measured transversely to the axis 6. This may be better understood by noting in FIG. 6e that hatched support area 110d has a much smaller area than cross-hatched leg 92d cross-sectional area 112d. This lesser cross-sectional area guarantees that magnetic saturation takes place preferentially at each support surface, corresponding to support surface 110d of leg 92d.

Figure 7A:
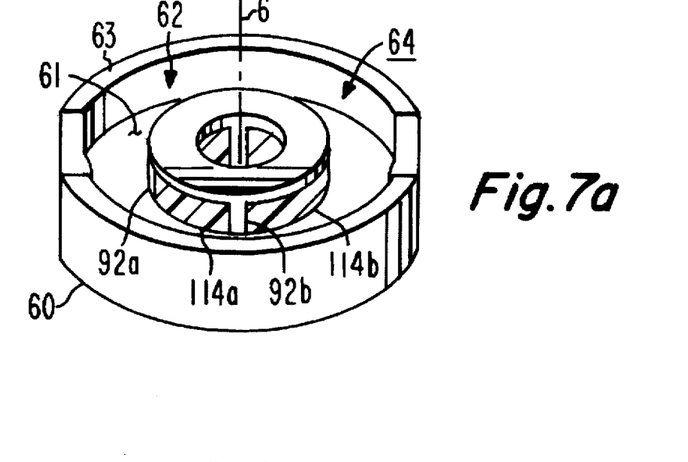
FIG. 7a is a view similar to that of FIG. 6a, with the apertures filled with a thermally conductive material.
Figure 7B:
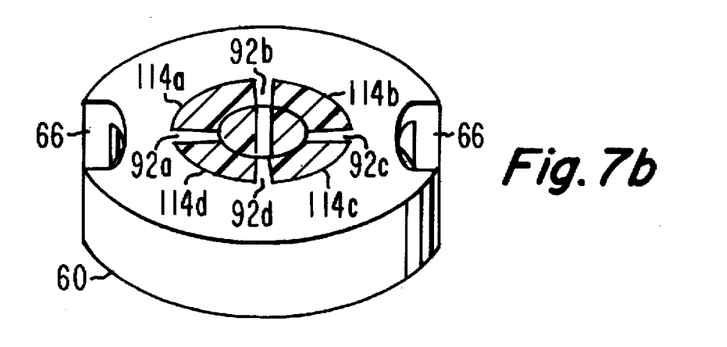
FIG. 7b is a view similar to that of FIG. 6c, with the apertures filled with thermally conductive material.
Figure 7C:
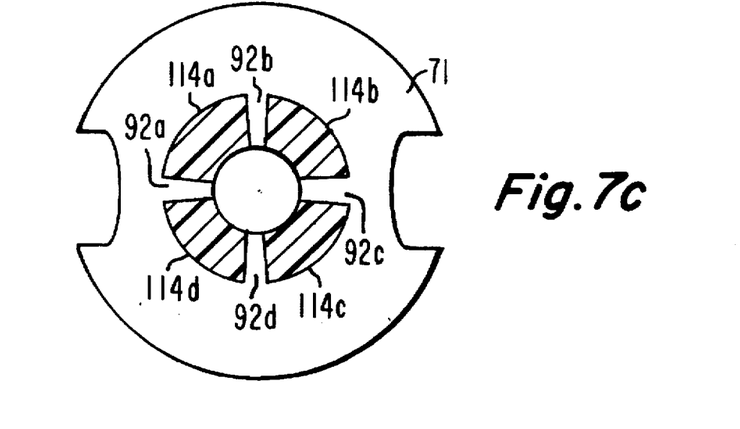
FIG. 7c is an axial view of the structure of FIG. 7b.

The legs 92 generated by cutting away parts of the post 64 and the bottom 61 of the shell portion 60 of the pot core arrangement are not as strong as might be desired. In order to strengthen the legs, and to provide improved heat conduction, the apertures 90a, 90b, 90c, and 90d are filled with a thermally conductive, non-ferromagnetic material. FIGS. 7a, 7b, and 7c represent the shell 60 after the addition of such a material. One desirable material is thermally conductive epoxy, which can be cast into the apertures using a removable mold to retain the desired shape. The epoxy is nonmagnetic. In FIGS. 7a, 7b, and 7c, the epoxy material is illustrated as four hatched regions 114a, 114b, 114c, and 114d, which fill the regions associated with apertures 90a, 90b, 90c, and 90d, respectively, of FIG. 6a. As an alternative, aluminum or some other diamagnetic material could be cast into the apertures 90, to further urge the magnetic fields to flow through the support regions of the legs, and thereby further enhance saturation therein.

Figure 8A:
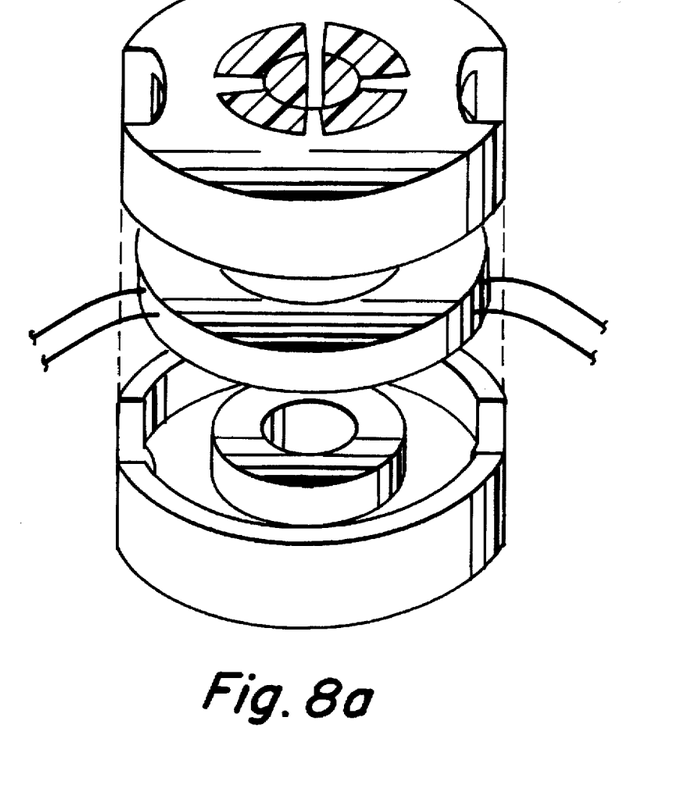
FIG. 8a is an illustration of an arrangement using two pot core sections, each having a cavity, to form the saturable reactor.
Figure 8B:
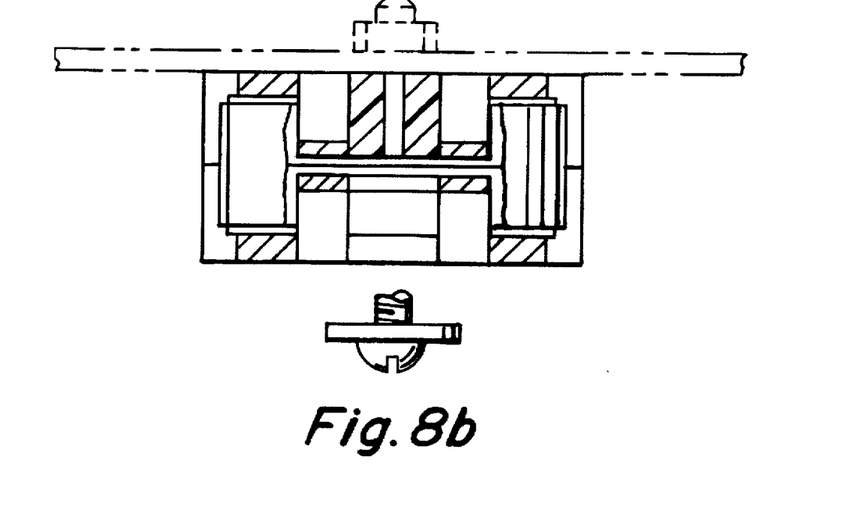
FIG. 8b is a cross-section thereof.

FIG. 8a is a perspective or isometric view, partially exploded, of an arrangement using a pot core similar to that of FIGS. 7a, 7b, and 7c, together with an unmodified pot core such as that of FIG. 5a. This arrangement places the cavities of the two pot core sections side-by-side, thereby providing more volume in which wires can be wound or in which a bobbin can be placed. This arrangement, therefore, allows the same number of turns of larger wire to be used than the previously described embodiments, or more turns of the same size wire can be used. A single modified pot core half, such as that of FIGS. 7a, 7b, and 7c can be used with any one of a plurality of different conventional pot core halves, each providing a different center leg gap, to provide control of the net inductance in the non-saturated mode.

Figure 9:
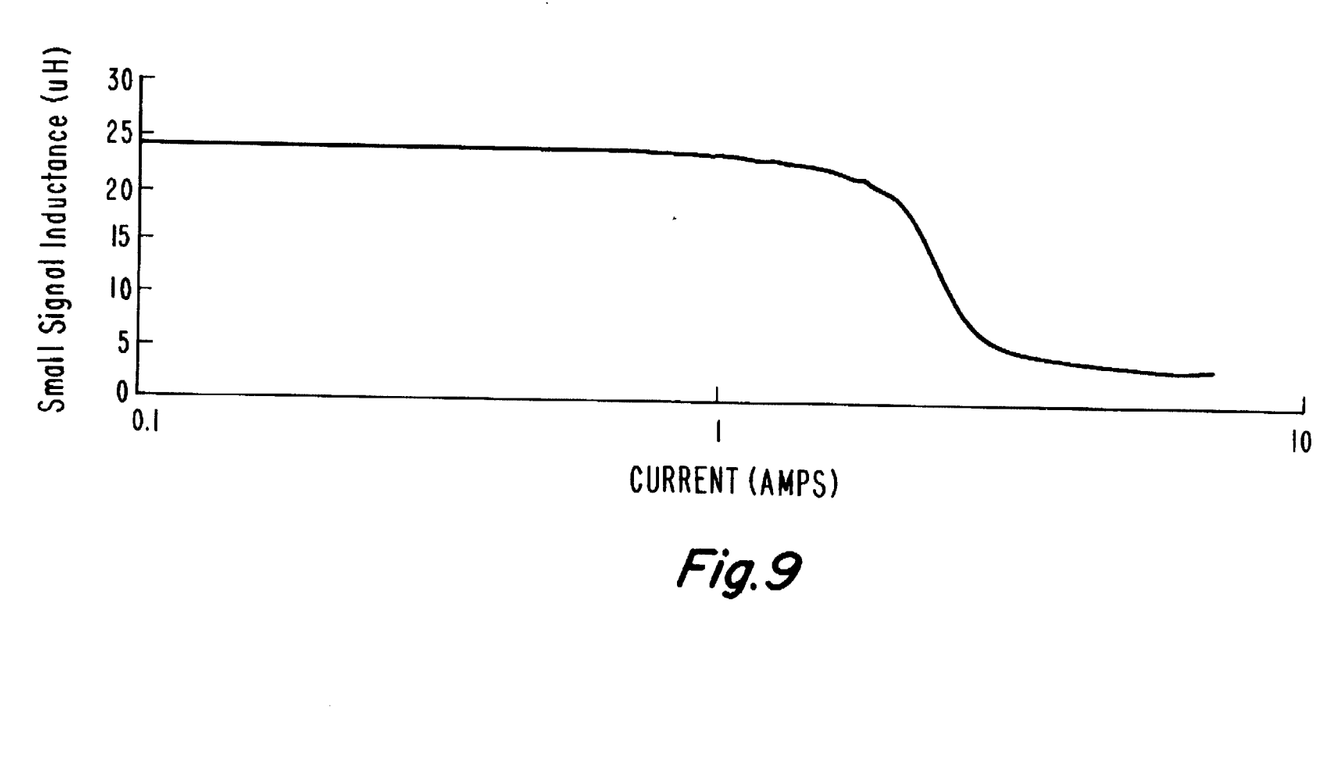
FIG. 9 is a plot of the measured inductance vs. current characteristic for a saturable inductor made according to the invention.

FIG. 9 is a plot of the measured small-signal inductance versus current in a saturable inductor made according to the invention.

Thus, a saturable reactor arrangement (8; 1, 54) according to the invention includes a ferromagnetic pot core arrangement (1) having, when assembled, the general exterior form of a right circular cylinder. The right circular cylinder defines first (51) and second (71) flat, mutually parallel, approximately circular ends, an axis (6), and a fastener clearance aperture (52, 68) passing through the right circular cylinder parallel to, and centered on, the axis (6). The first (51) and second (71) ends of the right circular cylindrical form are at least approximately centered on, and perpendicular to, the axis (6). The pot core arrangement (1) is divided into two ferromagnetic portions (50, 60) along a division plane (160p) perpendicular to the axis (6) and lying between the first (51) and second (71) ends. At least one of the portions (60) of the pot core arrangement (1; 50, 60) includes a ferromagnetic shell portion (60) which, together with the other one of the portions of the pot core arrangement, defines the right circular cylindrical exterior form. The ferromagnetic shell portion (60) of at least one of the portions of the pot core arrangement (1) has a shell thickness selected to define a cavity (62) within the shell, with the cavity (62) being in the general shape of a right circular cylinder defining a bottom (61) adjacent one of the first (51) and second (71) ends. The cavity (62) of the one of the portions (60) of the pot core arrangement (1) contains an axial post (64) defining proximal or support (110) and distal (80) ends. The proximal end (110) of the post (64) of the one of the portions (60) of the pot core arrangement (1) is monolithically affixed to the bottom (61) of the cavity (62), with the post (64) extending distally from the bottom (61), parallel with the axis (6), toward the division plane (160p). The post (64) contains a portion (68) of the axial fastener clearance aperture (52, 68). The post (64) of the one of the portions (60) of the pot core arrangement (1) further includes (a) a distal portion (80) of the post in the form of an annular ring of ferromagnetic material lying in a plane (181) parallel to the division plane (160p), (b) a plurality of apertures (90a, 90b, 90c, 90d) extending through the side of a second portion (65) of the post and the bottom (61), which second portion (65) of the post (64) lies between the distal portion (80) of the post (64) and the bottom (61), with the plurality of apertures (90a, 90b, 90c, 90d) being located so as to divide the second portion (65) of the post into a plurality of legs (92a, 92b, 92c, 92d), each of which legs extends from the bottom (61) of the cavity (62) to the distal portion (80) of the post (64), for supporting the distal portion (80) of the post (64) at a predetermined location (181) relative to the division plane (160p). The post (64) of the one of the portions (60) of the pot core arrangement (1) also has (c)each of the legs of the plurality of legs (92a, 92b, 92c, 92d) monolithically (not assembled, but one undivided piece) affixed to the bottom (61) along a support region or "surface" (110a, 110b, 110c, 110d) having a first dimension equal to the thickness of the bottom (61) of the cavity (62), and a second dimension equal to the width of that one of the legs (92a, 92b, 92c, 92d) being supported, and (d) the support areas (110a, 110b, 110c, 110d) of the plurality of legs (92a, 92b, 92c, 92d) have a cumulative or total area which is less than that of the distal portion (80) of the post (64) and less than that of the shell (60), so that magnetic fields generated within the cavity (62) of the pot core arrangement (1), and flowing through the post and the shell, must pass through the cumulative area of the support regions, and so that magnetic saturation of the pot core occurs preferentially at the support regions or areas, whereby the heat generated by magnetic saturation of the core preferentially occurs adjacent one (71) of the first (51) and second (71) ends of the pot core arrangement (1).

In a particular embodiment of the invention, the other one (50) of the portions of the pot core arrangement is a flat cover (50), but it may instead be similar to the one (60) of the portions defining a cavity (62). In a preferred embodiment, a thermally conductive, nonmagnetic material (epoxy) fills the plurality of apertures (90a, 90b, 90c, 90d) extending through the side portion of the second portion (65) of the post (64) and the bottom (61), to aid in transferring heat away from the support surfaces to a heat sink (800). The thermally conductive material may be thermally conductive epoxy. The preferred embodiments include a thermally conductive heat sink affixed to that one of the first and second ends of the pot core arrangement adjacent the thermally conductive, nonmagnetic material, for aiding in transferring heat away from the support surfaces. In one embodiment, the legs support the distal portion of the post at a predetermined location relative to the division plane, which location is selected to leave a gap (G) between the distal portion (80) of the post (64) the other one (50) of the portions of the pot core arrangement (1), so that the magnetic reluctance of the pot core arrangement (1) is established by the gap (G) in a linear operating regime, and by the support areas (110a, 110b, 110c, 110d) in a saturated operating regime.

The saturable reactor arrangement preferably includes a conductive coil (54) wound about the post (64) of the one (60) of the portions of the pot core assembly (1), and also includes a transformer (14) including a primary winding (14p) and a secondary (14s) winding, with the primary winding (14p) being serially connected with the coil (8) to define a series circuit (9). This embodiment also includes a switched bridge circuit (12) coupled to the series circuit (9), and adapted for applying alternating voltage ($V_{AB}$) thereto, as a result of which electrical drive, such as voltage, current, or a combination thereof, is generated at the secondary winding (14s) of the transformer (14). A unidirectional conducting device arrangement (16) is coupled to the secondary winding (14s) of the transformer (14), for rectifying the electrical drive, and a substantially linear reactor (18) is coupled to the unidirectional conducting device arrangement (16) and to a load (20, 22), for supplying electrical drive current to the load. The load includes a load resistance (22), and may include an integrating capacitor (20) for integrating voltage to establish a voltage across the resistance. A controller (FIGS. 2a, 2b, 2c, 2d) may be coupled to the switched bridge circuit (12), for causing the switches (Q1, Q2, Q3, Q4) of the bridge circuit (12) to switch in a manner tending to maintain constant electrical drive to the load.

A dc-to-dc converter (10) according to an aspect of the invention includes a switched bridge circuit (12) with load terminals (A, B), which switches in a manner which produces electrical drive across the load terminals (A, B). A series circuit (8, 14p) including a saturable reactor (or inductive reactance) (8) and the primary winding (14p) of a transformer (14) is coupled across the load terminals (A, B) of the bridge circuit (12). The transformer (14) also includes a secondary winding (14s) arrangement, which generates electrical drive when the bridge operates. The electrical drive is coupled to a rectifier arrangement (16), for rectifying the electrical drive from the secondary winding arrangement (14s), to produce rectified drive. The rectified drive is applied through a substantially linear inductor (18) or reactor to a load circuit (20, 22), which may include a resistive component (22) and a capacitive component (20). The saturable reactor includes a ferromagnetic pot core arrangement having, when assembled, the general exterior form of a right circular cylinder. The right circular cylinder defines first and second flat, mutually parallel, approximately circular ends, an axis, and a fastener clearance aperture passing through the right circular cylinder parallel to, and centered on, the axis. The first and second ends of the right circular cylindrical form are at least approximately centered on, and perpendicular to, the axis. The pot core arrangement is divided into two ferromagnetic portions along a division plane perpendicular to the axis and lying between the first and second ends. At least one of the portions of the pot core arrangement includes a ferromagnetic shell portion which, together with the other one of the portions of the pot core arrangement, defines the right circular cylindrical exterior form. The ferromagnetic shell portion of at least one of the portions of the pot core arrangement has a shell thickness selected to define a cavity within the shell, with the cavity being in the general shape of a right circular cylinder defining a bottom adjacent one of the first and second ends. The cavity of the one of the portions of the pot core arrangement contains an axial post defining proximal and distal ends. The proximal end of the post of the one of the portions of the pot core arrangement is monolithically affixed to the bottom of the cavity, with the post extending distally from the bottom, parallel with the axis, toward the division plane. The post contains the fastener clearance aperture. The post of the one of the portions of the pot core arrangement further includes (a) a distal portion of the post in the form of an annular ring of ferromagnetic material lying in a plane parallel to the division plane, (b) a plurality of apertures extending through the side of a second portion of the post and the bottom, which second portion of the post lies between the distal portion of the post and the bottom, with the plurality of apertures being located so as to divide the second portion of the post into a plurality of legs, each of which legs extends from the bottom of the cavity to the distal portion of the post, for supporting the distal portion of the post at a predetermined location relative to the division plane. The post of the one of the portions of the pot core arrangement also has (c) each of the legs of the plurality of legs monolithically affixed to the bottom along a support surface having a first dimension equal to the thickness of the bottom of the cavity, and a second dimension equal to the width of that one of the legs being supported, and (d) the surfaces of the support areas of the plurality of legs have a cumulative or total area which is less than that of the post and less than that of the shell, so that magnetic fields generated within the cavity of the pot core, and flowing through the post and the shell, must pass through the cumulative area of the support areas.

Other embodiments of the invention will be apparent to those skilled in the art. For example, while a nonmagnetic material such as thermally conductive epoxy has been described as filling the magnetic or ferromagnetic region around the legs of the post, the thermally conductive material may also be diamagnetic, to thereby aid in forcing the magnetic fields to pass through the desired portions of the legs. Practical unidirectional current conducting devices, as is notoriously well known to those skilled in the art, are always subject to leakage currents under at least some conditions of temperature and applied reverse voltage, and when such devices are mentioned, the existence of such leakages is always implied. While the saturable inductor 8 has been illustrated as a separate inductor, it may be combined on a core with another inductance arrangement, so long as its inductive and saturation characteristics are as described. Similarly, the linear inductor 18 has been described as a separate inductor, it may be combined on a core with other inductances, so long as its essential characteristics remain as described. Four "legs" 92 have been described, but any number of legs may be used. While a center-tapped transformer secondary winding 14s is described in conjunction with FIG. 1, those skilled in the art know that a four-diode full-wave bridge rectifier can be used with a non-center-tapped winding.

What is claimed is:

1. A saturable reactor arrangement, comprising:

a ferromagnetic pot core arrangement having, when assembled, the general exterior form of a right circular cylinder, said right circular cylinder defining first and second flat, mutually parallel, approximately circular ends, an axis, and a fastener clearance aperture passing through said right circular cylinder and said first and second ends centered on said axis, said pot core arrangement being divided into two portions along a division plane perpendicular to said axis and lying between said first and second ends, at least one of said portions of said pot core arrangement including a ferromagnetic shell portion which, together with the other of said portions of said pot core arrangement, defines said right circular cylindrical exterior form, said ferromagnetic shell portion of at least one of said portions of said pot core arrangement having a thickness selected to define a cavity within said shell, said cavity being in the general shape of a right circular cylinder defining a bottom adjacent one of said first and second ends, said cavity of said one of said portions of said pot core arrangement having an axial post defining proximal and distal ends, said proximal end of said post of said one of said portions of said pot core arrangement being monolithically affixed to said bottom, said post extending distally from said bottom, parallel with said axis, toward said division plane, said post containing said fastener clearance aperture;

said post of said one of said portions of said pot core arrangement further including (a) a distal portion of said post in the form of an annular ring of ferromagnetic material lying in a plane parallel to said division plane;

(b) a plurality of apertures extending through the side of a second portion of said post and said bottom, which second portion of said post lies between said distal portion of said post and said bottom, said plurality of apertures being located so as to divide said second portion of said post into a plurality of legs extending from said bottom to said distal portion of said post, for supporting said distal portion of said post at a predetermined location relative to said division plane, (c) each of said legs of said plurality of legs being monolithically affixed to said bottom along a support surface having a first dimension equal to the thickness of said bottom, and a second dimension equal to the width of that one of said legs being supported, (d) the surfaces of said support areas of said plurality of legs having a cumulative area less than that of said post and less than that of said shell, so that magnetic fields generated within said cavity of said pot core, and flowing through said post and said shell, must pass through said cumulative area of said support areas, and so that magnetic saturation of said pot core occurs preferentially at said surfaces of said support areas, whereby the heat generated by magnetic saturation of said core preferentially occurs adjacent one of said first and second ends of said pot core arrangement.

2. A saturable reactor arrangement according to claim 1, further comprising a thermally conductive, nonmagnetic material filling said plurality of apertures extending through the side of said second portion of said post and said bottom, to aid in transferring heat away from said support surfaces.

3. A saturable reactor arrangement according to claim 2, wherein said thermally conductive material is thermally conductive epoxy.

4. A saturable reactor arrangement according to claim 2, further comprising a thermally conductive heat sink affixed to that one of said first and second ends of said adjacent said thermally conductive, nonmagnetic material, for aiding in transferring heat away from said support surfaces.

5. A saturable reactor arrangement according to claim 1, wherein said legs support said distal portion of said post at a predetermined location relative to said division plane which leaves a gap between said distal portion of said post said other one of said portions of said pot core arrangement, whereby the magnetic reluctance of said pot core arrangement is established by said gap in a linear operating regime, and by said support areas in a saturated operating regime.

6. A saturable reactor arrangement according to claim 1, further comprising a conductive coil wound about said post of said one of said portions of said pot core assembly; and further comprising:
   a transformer including a primary winding and a secondary winding, said primary winding being serially connected with said coil to define a series circuit;
   a controllable switched bridge circuit coupled to said series circuit, and adapted for applying alternating voltage thereto, as a result of which electrical drive is generated at said secondary winding of said transformer;
   a unidirectional conducting device arrangement coupled to said secondary winding of said transformer, for rectifying said electrical drive;
   a substantially linear reactor coupled to said unidirectional conducting device arrangement and to a load, for supplying electrical drive current to said load; and
   control means coupled to said controllable switched bridge circuit, for causing the switches of said bridge circuit to switch in a manner tending to maintain constant electrical drive to said load.

7. A dc-to-dc converter for driving a load, said dc-to-dc converter comprising:
   a switched bridge circuit including load terminals;
   a series circuit coupled to said load circuit of said bridge circuit, said series circuit including a saturable reactor and the primary winding of a transformer, said transformer also including secondary windings at which electrical drive is generated in response to operation of said bridge circuit;
   an arrangement of unidirectional current conducting devices coupled to said secondary windings, for rectifying said electrical drive;
   a linear reactor coupled to said arrangement of unidirectional current conducting devices and to said load, for tending to maintain a characteristic of the electrical drive to said load;
   said saturable reactor comprising:
   (a) a ferromagnetic pot core arrangement having, when assembled, the general exterior form of a right circular cylinder, said right circular cylinder defining first and second flat, mutually parallel, approximately circular ends, an axis, and a fastener clearance aperture passing through said right circular cylinder and said first and second ends centered on said axis, said pot core arrangement being divided into two portions along a division plane perpendicular to said axis and lying between said first and second ends, at least one of said portions of said pot core arrangement including a ferromagnetic shell portion which, together with said other of said portions of said pot core arrangement, defines said right circular cylindrical exterior form, said ferromagnetic shell portion of said one of said portions of said pot core arrangement having a thickness selected to define a cavity within said shell, said cavity being in the general shape of a right circular cylinder defining a bottom adjacent one of said first and second ends, said cavity of said one of said portions of said pot core arrangement having an axial post defining proximal and distal ends, said proximal end of said post of said one of said portions of said pot core arrangement being monolithically affixed to said bottom, said post extending distally from said bottom, parallel with said axis, toward said division plane, said post containing said fastener clearance aperture;
   (b) said post of said one of said portions of said pot core arrangement further including
      (i) a distal portion of said post in the form of an annular ring of ferromagnetic material lying in a plane parallel to said division plane;
      (ii) a plurality of apertures extending through the side of a second portion of said post and said bottom, which second portion of said post lies between said distal portion of said post and said bottom, said plurality of apertures being located so as to divide said second portion of said post into a plurality of legs extending from said bottom to said distal portion of said post, for supporting said distal portion of said post at a predetermined location relative to said division plane,
      (iii) each of said legs of said plurality of legs being monolithically affixed to said bottom along a support surface having a first dimension equal to the thickness of said bottom, and a second dimension equal to the width of that one of said legs being supported,
      (iv) the surfaces of said support areas of said plurality of legs having a cumulative area less than that of said post and less than that of said shell, so that magnetic fields generated within said cavity of said pot core, and flowing through said post and said shell, must pass through said cumulative area of said support areas, and so that magnetic saturation of said pot core occurs preferentially at said surfaces of said support areas, whereby the heat generated by magnetic saturation of said core preferentially occurs adjacent one of said first and second ends of said pot core arrangement.

8. A saturable reactor arrangement according to claim 7, further comprising a thermally conductive, nonmagnetic material filling said plurality of apertures extending through the side of said second portion of said post and said bottom, to aid in transferring heat away from said support surfaces.

9. A saturable reactor arrangement according to claim 8, wherein said thermally conductive material is thermally conductive epoxy.

10. A saturable reactor arrangement according to claim 8, further comprising a thermally conductive heat sink affixed to that one of said first and second ends of said adjacent said thermally conductive, nonmagnetic material, for aiding in transferring heat away from said support surfaces.

11. A saturable reactor arrangement according to claim 7, wherein said legs support said distal portion of said post at a predetermined location relative to said division plane which leaves a gap between said distal portion of said post and the other one of said portions of said pot core arrangement, whereby the magnetic reluctance of said pot core arrangement is established by said gap in a linear operating regime of said saturable reactor, and by said support areas in a saturated operating regime.

* * * * *